United States Patent [19]

Ichiyoshi

[11] Patent Number: 5,548,334
[45] Date of Patent: Aug. 20, 1996

[54] VIDEO CAMERA HAVING VIEWFINDER ROTATABLY MOUNTED ON CAMERA BODY

[75] Inventor: Hiroyuki Ichiyoshi, Kanagawa-ken, Japan

[73] Assignee: Canon Kabushiki Kaisha, Tokyo, Japan

[21] Appl. No.: 357,088

[22] Filed: Dec. 15, 1994

Related U.S. Application Data

[63] Continuation of Ser. No. 216,127, Mar. 22, 1994, abandoned, which is a continuation of Ser. No. 941,764, Sep. 4, 1992, abandoned, which is a continuation of Ser. No. 636,571, Jan. 2, 1991, abandoned.

[30] Foreign Application Priority Data

Jan. 11, 1990 [JP] Japan ............................. 2-2601
Jan. 11, 1990 [JP] Japan ............................. 2-2602

[51] Int. Cl.$^6$ ............................................. H04N 5/225
[52] U.S. Cl. ................................... 348/341; 348/375
[58] Field of Search ................................. 348/373, 374, 348/375, 376, 341, 207, 335; 354/275, 288, 292; H04N 5/225

[56] References Cited

U.S. PATENT DOCUMENTS

| | | | |
|---|---|---|---|
| 4,625,243 | 11/1986 | Takubo | 358/229 |
| 4,772,902 | 9/1988 | Inoue et al. | 358/82 |
| 4,959,729 | 9/1990 | Fukuda et al. | 358/229 |
| 4,963,987 | 10/1990 | Ichiyoshi et al. | 358/229 |

Primary Examiner—Wendy Greening
Assistant Examiner—Tuan V. Ho
Attorney, Agent, or Firm—Robin, Blecker, Daley & Driscoll

[57] ABSTRACT

In a video camera, an outward protruding part is provided on a camera body which contains a converter for converting an object image into a video signal; a rotary unit having a viewfinder which is capable of displaying an image related to the video signal is provided with a connecting part which is of a shape corresponding to the protruding part; and the connecting part is turnable relative to the protruding part. The camera is thus arranged to be adequately operable under any shooting condition, to permit effective utilization of spaces available within the camera body, to reduce a load on the connecting part and to permit reduction in weight. Further, in the video camera, with first and second connecting parts provided on the camera body which contains the converter for converting the object image into a video signal, the viewfinder which is capable of displaying an image related to the video signal is turnably carried by the first connecting part; a rotary member which is disposed near a grip for holding the camera body is turnably carried by the second connecting part; and the viewfinder is interlocked with the rotary member. The camera arranged in this manner is also adequately operable under any shooting condition and reduces a load on each connecting part and thus reduces the weight of the camera.

9 Claims, 13 Drawing Sheets

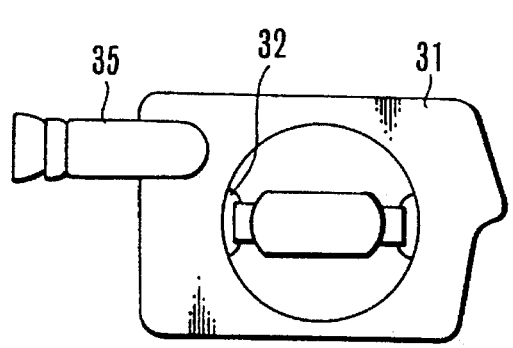
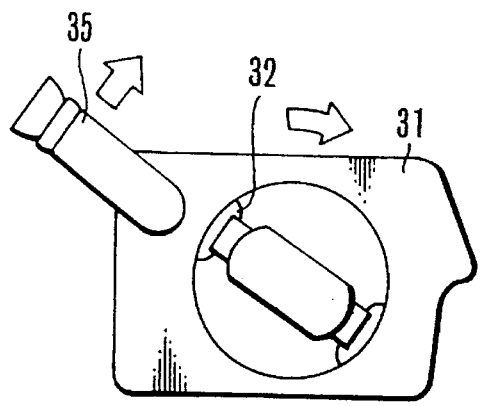
FIG.14A  FIG.14B
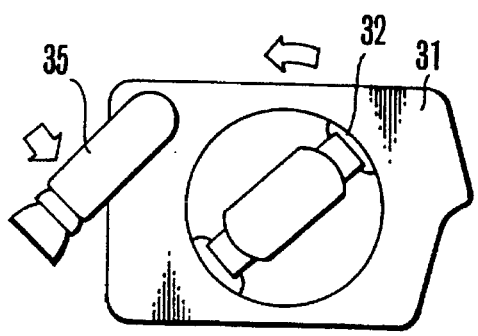
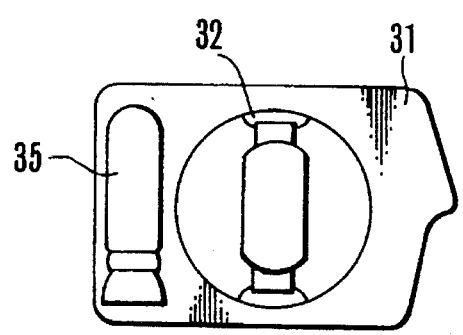
FIG.14C  FIG.14D

VIDEO CAMERA HAVING VIEWFINDER ROTATABLY MOUNTED ON CAMERA BODY

This is a continuation application under 37 CFR 1.62 of prior application Ser. No. 08/216,127, filed Mar. 22, 1994 now abandoned, which is a continatuion application under 37 CFR 1.62 of prior application Ser. No. 07/941,764, filed Sep. 4, 1992, now abandoned, which is a continuation application under 37 CFR 1.62 of prior application Ser. No. 636,571, filed Jan. 2, 1991, now abandoned.

BACKGROUND OF THE INVENTION

1. Field of the Invention

This invention relates to a video camera having a viewfinder and more particularly to a video camera having a viewfinder which is arranged to be turnable relative to the camera body.

2. Description of the Related Art

The known cameras of the above-stated kind are as shown in FIGS. 1, 2 and 3 of the accompanying drawings.

In the case of the camera shown in FIG. 1, a grip part 5 which is provided for holding the camera body 1 is secured to the camera body 1. A viewfinder 3 which is provided for confirmation of a photo-taken object in shooting is arranged to be turnable in the directions of the arrows for adjustment of its inclination.

In the case shown in FIG. 2, the viewfinder 3 is turnably mounted on an upper part of the camera body 1. The grip part 5 is turnably mounted on a lower part of the camera body 1. They are thus respectively arranged to have their inclinations adjustable.

In the case of FIG. 3, the grip part 5 and the viewfinder 3 are unified in one body and are arranged to be turnable together relative to the camera body 1 by means of a turning mechanism provided on the grip part 5. The details of this arrangement have been disclosed, for example, in U.S. Pat. No. 4,963,987.

With the camera arranged as shown in FIG. 1, the display of the viewfinder 3 can be easily confirmed by turning the viewfinder 3. However, in shooting at a low angle, the grip part 5 is not easily holdable in a normal state as the grip part 5 is secured to the camera body 1. This necessitates either readjustment of a hold taken on the camera in that instance or the provision of a trigger switch solely for low-angle shooting. Further, under such a condition, the camera might be dropped from the hand. Further, in the case of high-angle shooting, the display of the viewfinder 3 is not readily confirmable because of the lack of arrangement for the angle of elevation.

The camera of FIG. 2 permits not only inclination adjustment of the viewfinder 3 but also that of the grip part 5 by virtue of a turning mechanism. The camera thus permits adequate shooting at a normal shooting angle or at any angle close thereto. However, the shootable angle is limited. Therefore, the camera is not easily operatable, because it allows an insufficient amount of latitude for a wider range of shooting angles. Another disadvantage of the camera of this type resides in its inferiority in respect of portability as the arrangement inevitably increases the size of the camera.

The video camera of FIG. 3 permits ease of shooting at high and low angles. In addition to that, the arrangement to unify the grip part 5 with the viewfinder 3 is applicable to cameras of relatively small sizes. However, in order to make the whole unit of the viewfinder turnable including the grip part, the turning part of the unit must be arranged to have a high degree of strength. Besides, in designing the mechanism of this part, the arrangement has hindered efforts to further reduce the size of the camera through more efficient space utilization.

SUMMARY OF THE INVENTION

Such being the background, it is a general object of this invention to provide an improvement in the video camera of the kind having a turnable viewfinder.

It is a more specific object of the invention to provide a video camera which permits reduction in weight of a turning mechanism, effective space utilization and shooting at any desired shooting angle.

Under this object, a video camera which is arranged as an embodiment of this invention comprises a camera body which contains therein converting means for converting an object image into an electrical video signal, the camera body being provided with an outward protruding part; and a rotary unit having a viewfinder arranged to be capable of displaying an image related to the video signal, the rotary unit having a connection part which is of a shape corresponding to the protruding part and is carried by the protruding part in such a way as to be turnable relative to the protruding part.

Further a video camera arranged as another embodiment of the invention comprises a camera body which contains therein converting means for converting an object image into an electrical video signal, the camera body having first and second connecting parts; a viewfinder which is carried by the first connecting part in such a way as to be turnable relative to the camera body and is capable of displaying an image related to the video signal; a rotary member which is carried by the second connecting part in such a way as to be turnable relative to the camera body and is disposed in the vicinity of a grip which is provided for holding the camera body; and interlocking means for interlocking the viewfinder with the rotary member.

The above and other objects and features of the invention will become apparent from the following detailed description of embodiments thereof taken in conjunction with the accompanying drawings.

BRIEF DESCRIPTION OF THE DRAWINGS

FIG. 5 is a front view of the same video camera; and

FIGS. 14A to 14D are side views showing the turning movement of the grip part of the video camera of FIG. 12.

DETAILED DESCRIPTION OF THE PREFERRED EMBODIMENTS

Figure 1:
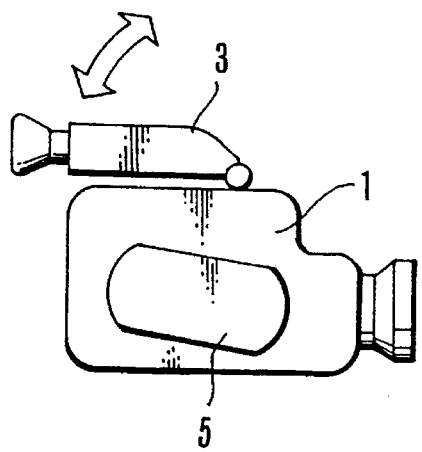
FIG. 1 is a side view showing an example of an arrangement of a conventional video camera.
Figure 2:
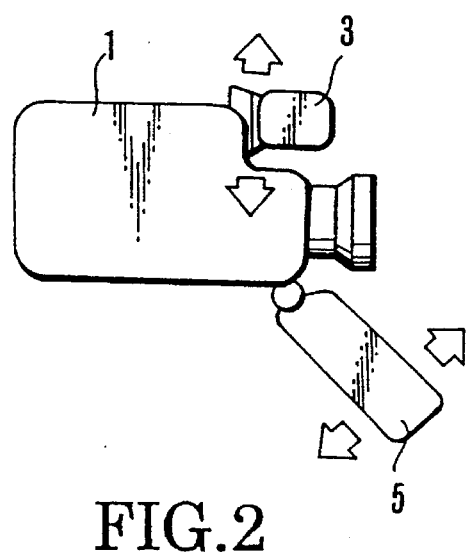
FIG. 2 shows another example of an arrangement of the conventional video camera.
Figure 3:
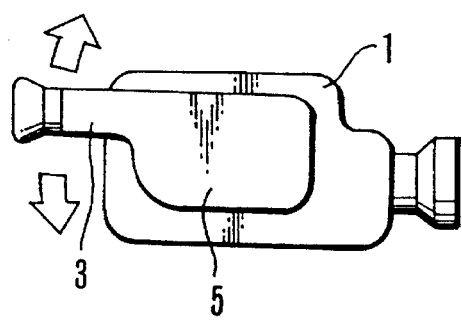
FIG. 3 shows a further example of an arrangement of the conventional video camera.
Figure 4:
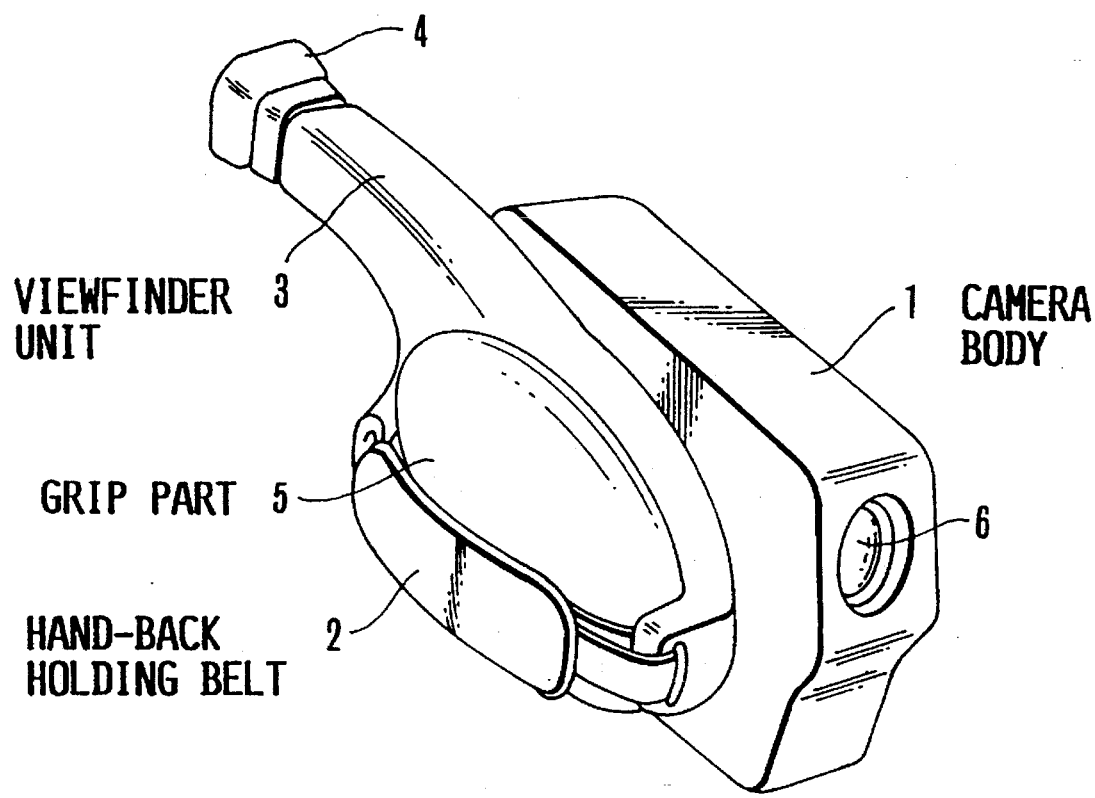
FIG. 4 is an oblique view showing the arrangement of a video camera embodying this invention.
Figures 5A, 5B:
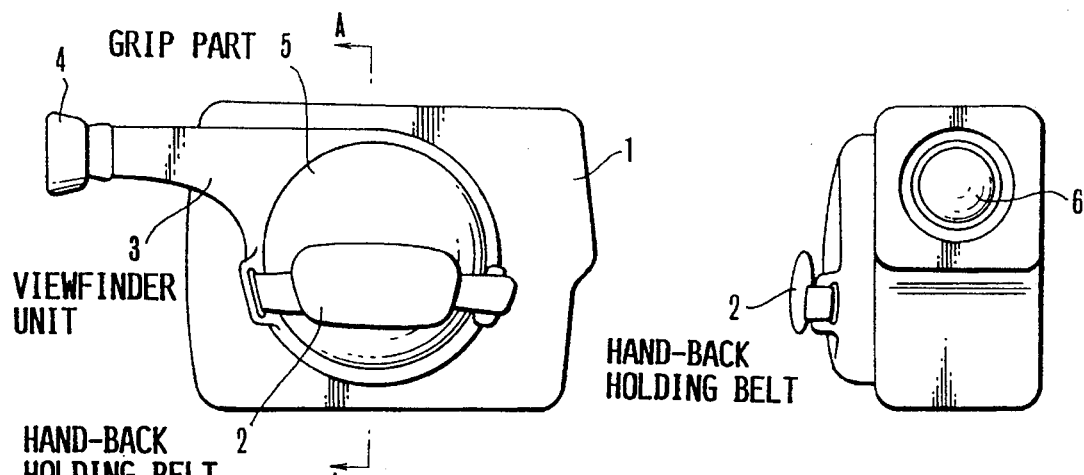
FIG. 5A is a side view of the video camera of FIG. 4.
Figure 5C:
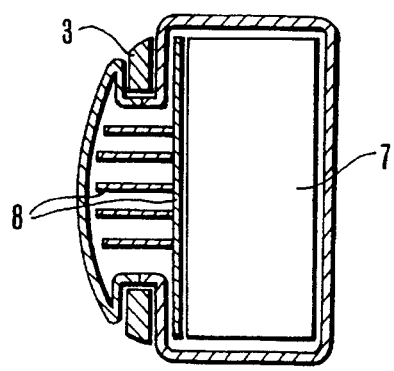
FIG. 5C is a sectional view showing the essential parts of the same video camera.
Figure 6:
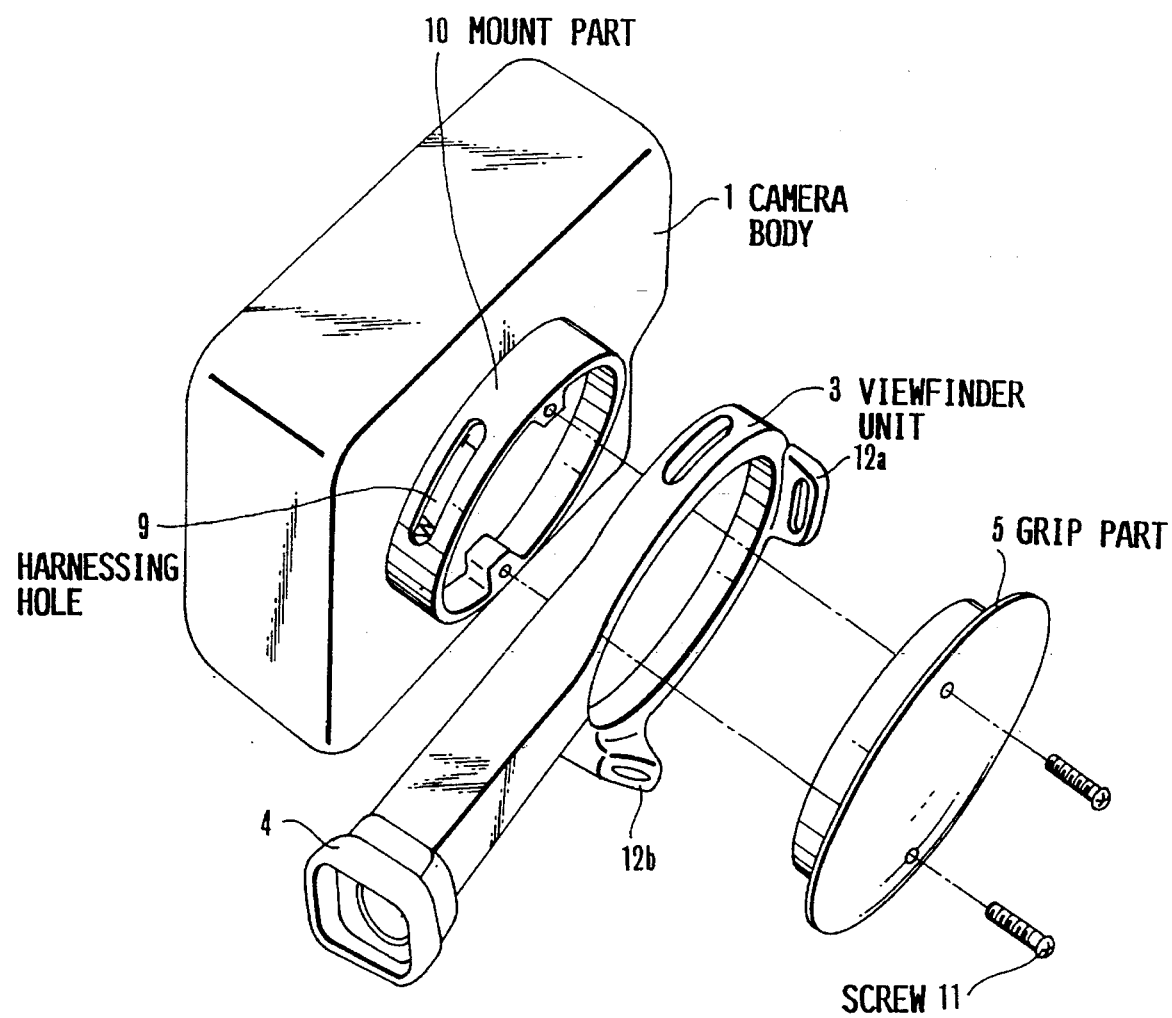
FIG. 6 is an exploded view of the same video camera.

A video camera embodying this invention is arranged as described below with reference to the accompanying drawings:

FIG. 4 is an oblique view showing the video camera in a normal shooting posture. FIGS. 5A and 5B are side and front views of the same video camera. FIG. 5C is a sectional view which is taken on a line A—A of FIG. 5A and shows the internal mechanism of the camera. FIG. 6 is an exploded view of the camera of this embodiment.

In these drawings, a reference numeral 1 denotes a camera body. A hand-back holding belt 2 is arranged to hold the back of the hand. A viewfinder unit 3 is arranged to be turnable and, in this case, includes an electronic viewfinder (hereinafter referred to as EVF). The video camera includes an eyepiece part 4; a fixed grip part 5; a photo-taking lens 6; a recorder mechanism unit 7; a circuit board 8; a harnessing hole 9 which is provided for connecting the camera body 1 with the viewfinder unit 3 by passing cords etc., through this hole; a mount part 10 which is provided for mounting the viewfinder unit 3 on the cylindrical peripheral face thereof; and screws 11. The viewfinder unit 3 is formed in one body with belt mount members 12a and 12b which are arranged to hold the hand-back holding belt 2 with the belt 2 mounted on a cylindrical part of the view finder unit 3. In the case of this embodiment, the grip part 5 is secured to the camera body 1 with the screws 11. The viewfinder unit 3 is turnably inserted in between the camera body 1 and the grip part 5. When the viewfinder unit 3 is turned, the hand-back holding belt 2 moves along with the viewfinder unit 3 to give a natural shooting posture while the grip part 5 remains fixed to the camera body 1.

Since the hand-back holding belt 2 which is provided for keeping a grip on the camera is arranged to be movable relative to the grip part 5 along with the viewfinder unit 3, the grip part 5 itself does not have to be turned. This is an advantage for a basic design, because the circuit board can be arranged inside the grip part 5, which is an umbrella-shape part, and thus permits effective utilization of the inner space of the grip part 5. Besides, this permits reduction in the thickness of the grip part 5 for reduction in the size of the camera.

Figure 7:
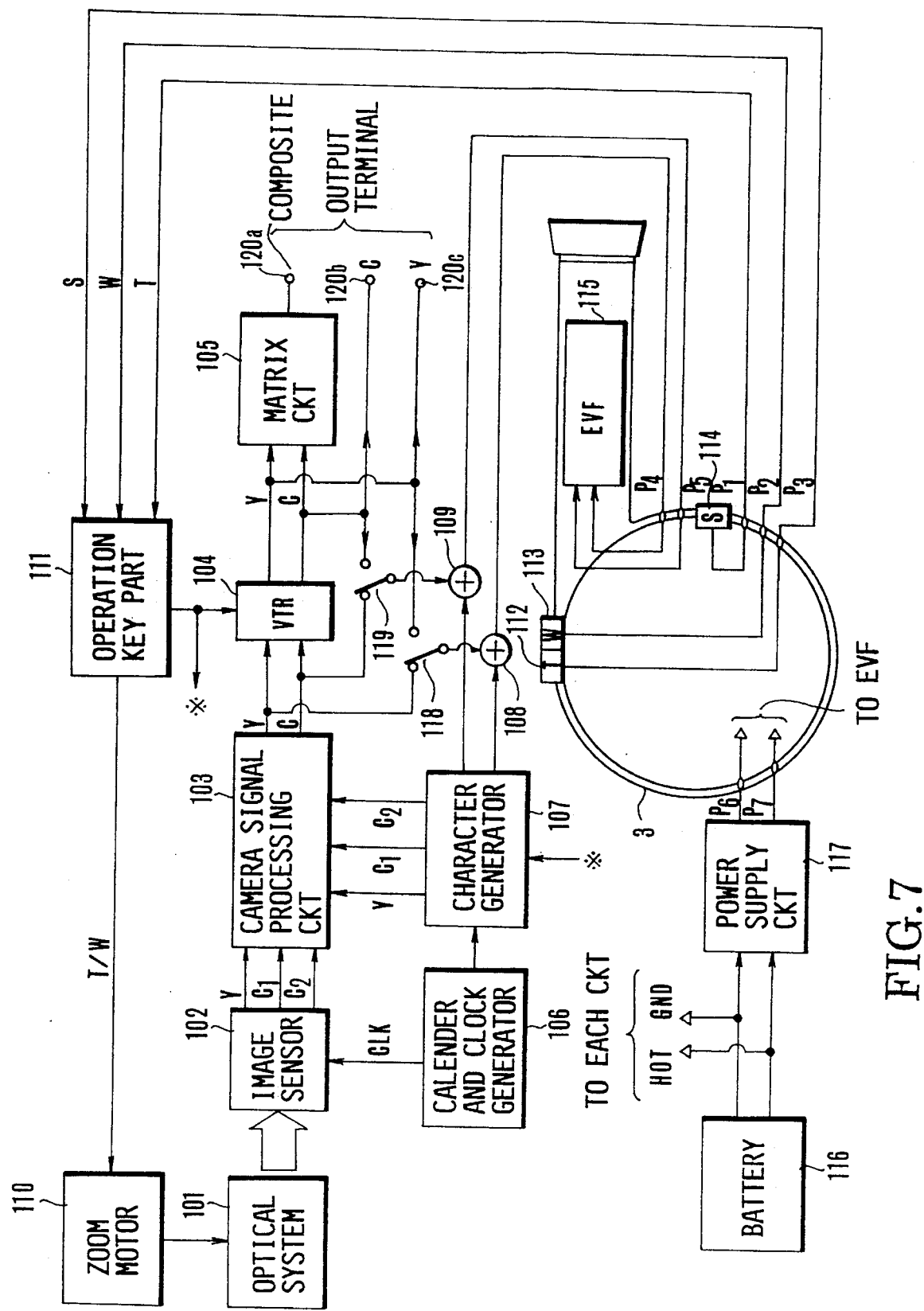
FIG. 7 is a circuit diagram showing in outline the arrangement of the whole circuit arrangement of the same video camera.

FIG. 7 shows in outline the circuit arrangement of the whole video camera of this embodiment. Referring to FIG. 7, a light flux coming from a photo-taken object is imaged on an image sensor 102 through a photo-taking optical system 101. The image is converted into a luminance signal Y and color-difference signals C1 and C2 by the image sensor 102. These signals Y, C1 and C2 are supplied to a camera signal processing circuit 103 to be converted into the luminance signal Y and the chrominance signal C of a video signal. The luminance signal Y and the chrominance signal C are supplied to a VTR 104. In a recording mode, the VTR 104 records the video signal which consists of the signals Y and C. In a reproduction mode, the VTR 104 reproduces a video signal previously recorded. The reproduced signal can be output from output terminals 120b and 120c in a state of being separated into the luminance and chrominance signals Y and C. Meanwhile, a composite video signal is obtained, at the same time, via a matrix circuit 105 to be output from another output terminal 120a. The recording mode or the reproduction mode is selected at an operation key part 111. The VTR 104 is controlled according to information on the mode selected by the operation key part 111. Switches 118 and 119 are arranged to select the luminance signal Y and the chrominance signal C which come from the camera in the case of the recording mode, and the signals Y and C which come from the VTR 104 in the case of the reproduction mode. The signals selected by these switches 118 and 119 are supplied to sliding contacts P4 and P5 via adders 108 and 109 respectively and are thus supplied to the EVF (electronic viewfinder) 115.

The adders 108 and 109 are arranged to receive character signals indicating the operation mode of the VTR, etc. More specifically, the above-stated mode information is supplied to a character generator 107. Then, character signals corresponding to the mode information are supplied to the adders 108 and 109. Further, in accordance with information on a date (year, month and day) and time which comes from a calendar and clock generator 106, the character generator 107 supplies character signals indicating the information to the camera signal processing circuit 103 to have them added to the signals Y, C1 and C2 of the video signal, for the purpose of having them superimposed on the video signal of the camera when the video signal is recorded by the VTR 104. The character signals are supplied also to the adders 108 and 109.

In FIG. 7, a reference symbol Y denotes a video luminance signal. A symbol C1 denotes, for example, an R-Y color-difference signal and a symbol C2 a B-Y color-difference signal. A symbol C denotes a chrominance signal which is obtained by multiplexing (for example, orthogonal two-phase modulating) the signals C1 and C2.

Sliding contacts P6 and P7 are arranged to allow power supply from the camera body 1 to the viewfinder unit 3 while the power supply from a battery 116 is stabilized by a power supply circuit 117 to be adapted to the driving of the EVF 115.

A recording trigger switch S, a wide-angle zoom switch W and a telephoto zoom switch T are provided on the viewfinder unit 3. Information on the operating states of these switches S, W and T is transmitted via sliding contacts P1, P2 and P3 to the operation key part 111. Then, the operation of the VTR 104 and the zooming action of the optical system 101 are controlled according to the operating states of these switches. Every time the recording trigger switch (S) 114, i.e., a recording start/stop switch, is operated, the VTR 104 is caused by the operation key part 111 to begin or stop recording. When the telephoto zoom switch (T) 112 is operated, the zoom motor 110 drives the optical system 101 to move to a telephoto position. When the wide-angle zoom switch (W) 113 is operated, the zoom motor 110 drives the optical system 101 to move to a wide-angle position.

As apparent from the above description, the video camera is arranged not to impair the operability thereof. The arrangement permits reduction in size and weight of the rotary part. As described above, the video camera embodying this invention is provided with the hand-back holding belt which is attached to the viewfinder unit 3. The viewfinder unit 3 is arranged to be turnably interposed in between the camera body 1 and the grip part 5. The arrangement permits shooting at any desired angle without impairing the feeling of hold kept on the camera despite the fixed state of the grip part 5 to the camera body 1. The arrangement does not impose any difficulty on design work and is advantageous in respect to reduction in size of the video camera.

Figure 8:
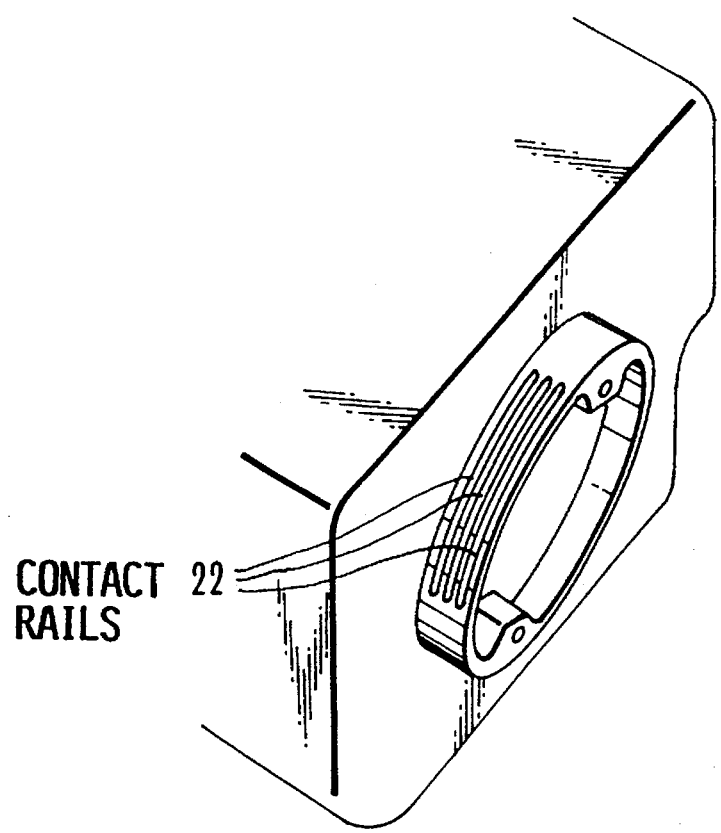
FIG. 8 is an oblique view showing by way of example the essential parts of a modification of the video camera of FIG. 4.
Figure 9:
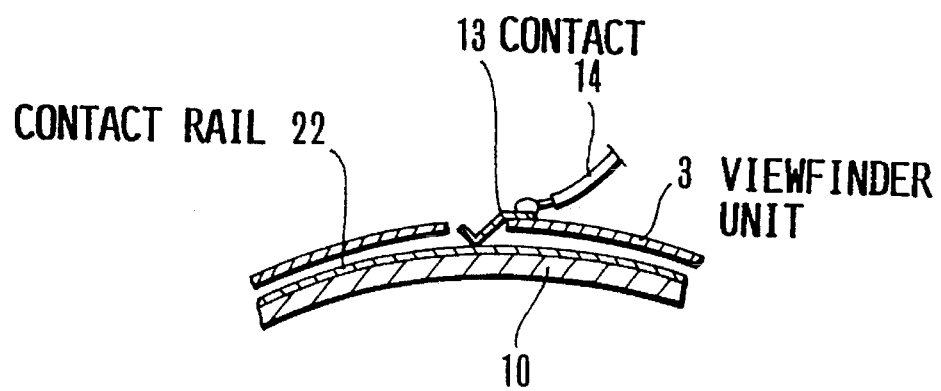
FIG. 9 is a sectional view showing the essential parts of the modification example shown in FIG. 8.

The embodiment described above is arranged to connect the camera body 1 to the viewfinder unit 3 by means of cords or the like through the harnessing hole 9. This arrangement, however, may be changed to connect the viewfinder unit 3 by means of metal contact rails 22 as shown in FIG. 8. FIG. 9 shows in a sectional view a video camera which is arranged to have the viewfinder unit 3 electrically connected by means of the contact rails. In this case, an electrically connected state is maintained while contacts 13 having connection wires 14 are moving on the contact rails 22 when the viewfinder unit 3 is turned. The mount part 10 on which the viewfinder unit 3 is mounted can be reinforced by this arrangement. This also facilitates assembly and servicing work.

Figure 10:
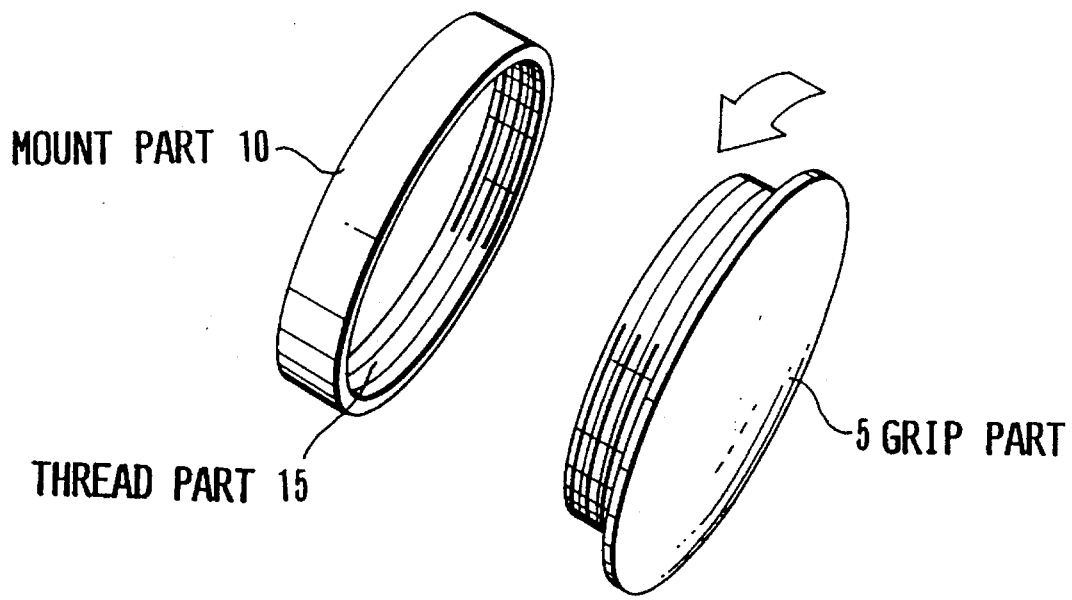
FIG. 10 is an oblique view showing the essential parts of another example of modification of the video camera shown in FIG. 4.
Figure 11:
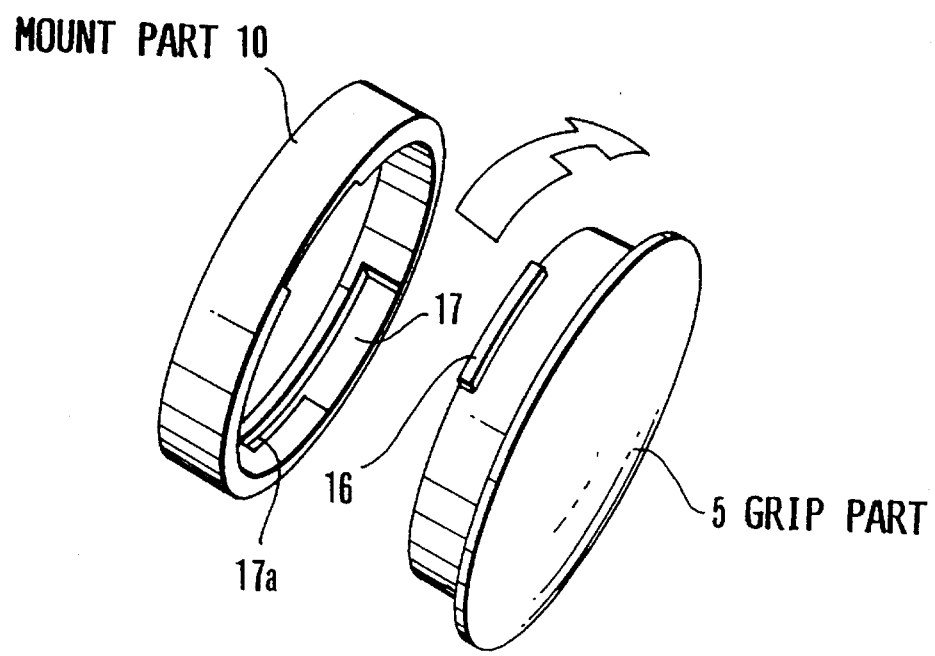
FIG. 11 is an oblique view showing the essential parts of a further example of modification of the video camera shown in FIG. 4.

In the case of the embodiment described, the grip part 5 is secured to the camera body 1 with the screws 11. However, the grip part 5 may be secured to the camera body 1 in a different manner. For example, the grip part 5 may be screwed into a thread part 15 of the mount part 10 by tapping the grip part 5 in the direction of arrow, as shown in FIG. 10, or may be locked to a part 17a of a recessed part 17 provided in the mount part 10 through a protruding part 16 provided on the grip part 5, as shown in FIG. 11. Such arrangement shows no screw on the outside to give a better appearance.

The video camera described has the viewfinder unit and the hand-back holding belt arranged to be turnable together with the viewfinder unit turnably interposed in between the camera body 1 and the grip part 5. The arrangement permits shooting at any desired shooting angle without impairing the camera holding feeling. Another advantage lies in that it permits effective space utilization in designing for reduction in size of the video camera.

Figure 12:
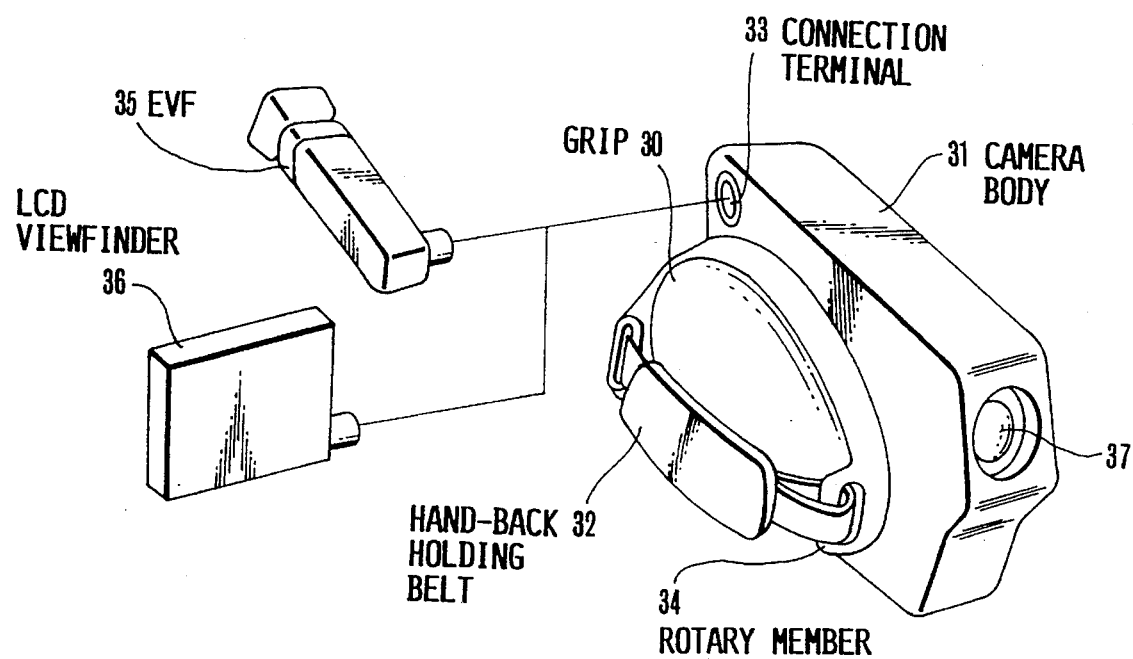
FIG. 12 is an oblique view showing the arrangement of a video camera arranged as another embodiment of the invention.
Figure 13:
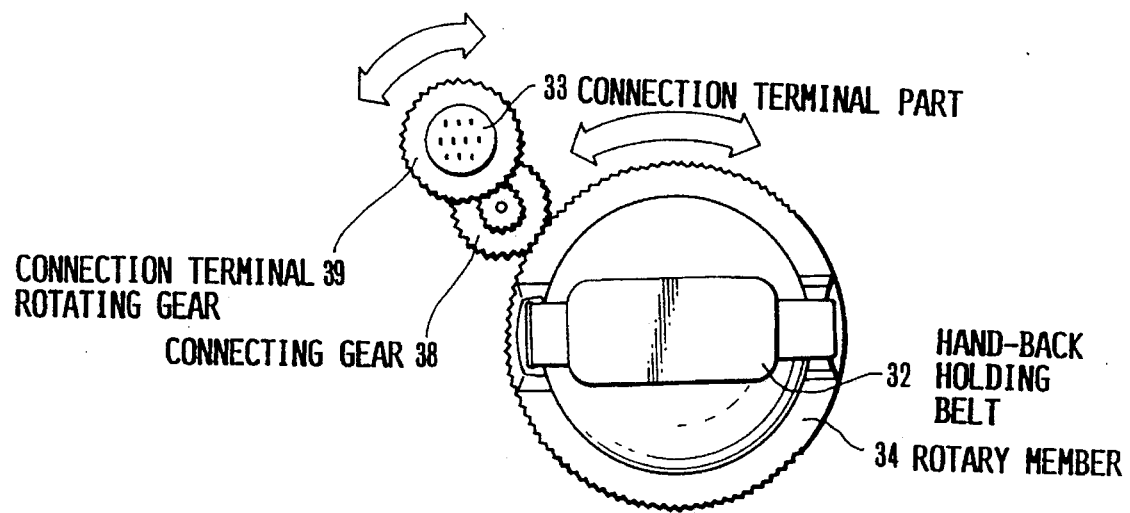
FIG. 13 shows by way of example the arrangement of a turning movement control part of the video camera of FIG. 12.

FIG. 12 shows in an oblique view a video camera which is arranged as another embodiment of this invention. In this case, a grip 30 and a connection terminal part 33 are disposed on a camera body 31. FIG. 13 shows in outline a turning movement control part of the video camera. FIGS. 14A, 14B and 14C are side views showing the inclining positions of the hand-back holding belt of the grip part and those of a viewfinder obtained respectively in normal shooting, low-angle shooting and high-angle shooting. FIG. 14D is a side view showing the viewfinder in a stowed state.

These drawings include the grip 30; the camera body 31; the hand-back holding belt 32; the connection terminal part 33; a rotary member 34 on which the hand-back holding belt 32 is mounted; an electronic viewfinder (EVF) 35; an LCD (large liquid crystal display device) viewfinder 36; a phototaking lens 37; a connecting gear 38 which is interlocked with the rotary member 34; and connection terminal rotating gear 39. As shown in FIG. 12, the EVF 35 is arranged to be replaceable with the LCD viewfinder 36. One of these viewfinders 35 and 36 is arranged to be selectively and removably attachable by one touch to the connection terminal part 33. The rotary member 34 is arranged on the periphery of the grip 30 to be turnable together with the hand-back holding belt 32. The connection terminal part 33 turns along with the rotary member 34. As shown in FIG. 13, the turn control part is arranged as follows: When the rotary member 34 turns to the right, the rotating gear 39 is caused via the connecting gear 38 to turn in the same direction. When the rotary member 34 turns to the left, the rotating gear 39 also turns to the left.

As shown in FIGS. 14A, 14B and 14C, a grip holding angle (the angle of the hand-back holding belt 32) and the angle of the viewfinder 35 are always the same as each other. The viewfinder 35 or 36 is thus arranged to be turnable in association with the rotary member 34 of the grip 30. When the viewfinder 35 is stowed as shown in FIG. 14D, the viewfinder 35 is within an angle range not protruding from the projection surface of the camera body 31. The connecting gear 38 of course does not have to be a single gear. It may be arranged to be a gear unit including a plurality of gears. Further, besides the viewfinder, a large TV monitor, a color EVF, etc., of course can be connected to the connection terminal part 33.

The rotary member 34 may be arranged either to be turnable together with the grip 30 or to be mounted on the periphery of the grip 30 in such a way as to have it turnable alone relative to the camera body 31. In the latter case, the grip 30 is secured to the camera body 31. In that case, the hand-back holding belt 32 of course must be turnable together with the rotary member 34.

Figure 15:
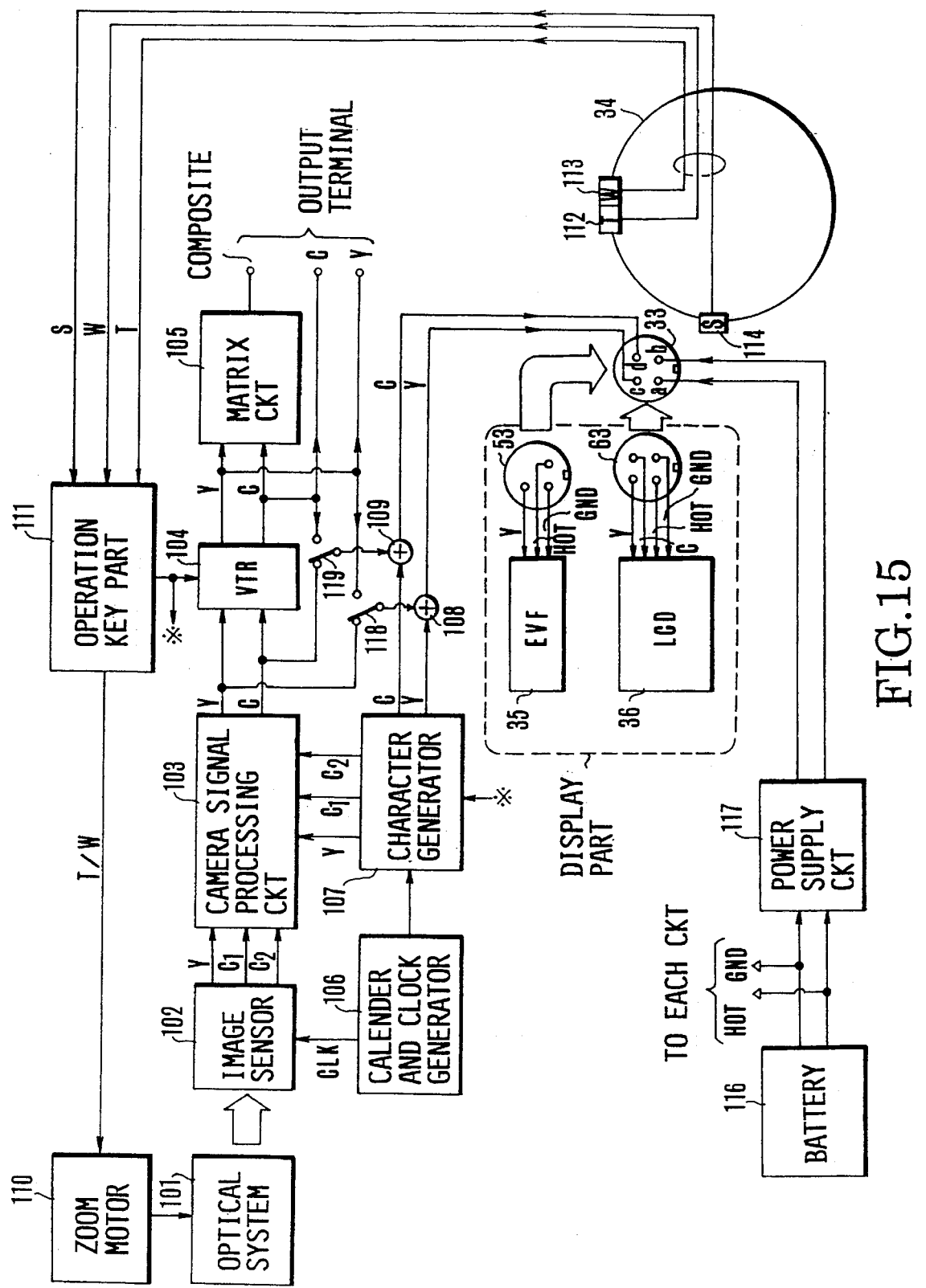
FIG. 15 is a circuit diagram showing in outline the whole circuit arrangement of the video camera of FIG. 12.

FIG. 15 shows the circuit arrangement of the whole video camera which is arranged in the above-stated manner as the embodiment of the invention. In FIG. 15, the same component elements as those of FIG. 7 are indicated by the same reference numerals and the details of them are omitted from the following description.

A display signal to be supplied to the display part which is composed of the EVF 35 or the LCD viewfinder 36 is obtained as follows: Switches 118 and 119 select a video signal formed by the camera in the case of recording or a video signal from the VTR in reproduction. The vide signal thus selected is supplied to the connection terminals "c" and "d" of the connection terminal part 33 via adders 108 and 109.

Terminals "a" and "b" of the connection terminal part 33 are arranged to receive from the camera body 31 the power of a battery 116 after the power is stabilized by a power supply circuit 117 into a state suited for driving the display device 35 or 36. Either the EVF 35 which has a three-pin connector 53 corresponding to the terminals "a", "b" and "c" excluding the terminal "d" or the LCD (viewfinder) 36 which has a four-pin connector 63 can be attached to the connection terminal part 33. In this case, the connection terminal part 33 is provided with terminals "a" and "b" for power supply and terminals "c" and "d" for luminance and chrominance signals Y and C.

In this case, the EVF is arranged to make a black-and-white display and the LCD a color display. However, the invention is not limited to this. In accordance with the invention, a color type EVF is of course usable in place of the EVF of the black-and-white type.

The embodiment described is a camera-integrated type VTR. The camera-integrated type VTR is arranged, as described above, to have the hand-back holding belt of the grip turnably mounted on the rotary member which is turnable relative to the camera body. The belt is thus arranged to be interlocked with the connection terminal part on which the viewfinder is turnably mounted. This arrangement permits the camera operator to have an optimum viewfinder position by just connecting the viewfinder to the connection terminal part. The video camera thus can be safely operated in a natural posture at any desired shooting angle. Besides, when the video camera (or camera-integrated type VTR) is not in use, or when it is being carried, the viewfinder can be simply set in its stowed position. Therefore, the camera is easily operable and has less degree of possibility of damage by collision.

Figure 16:
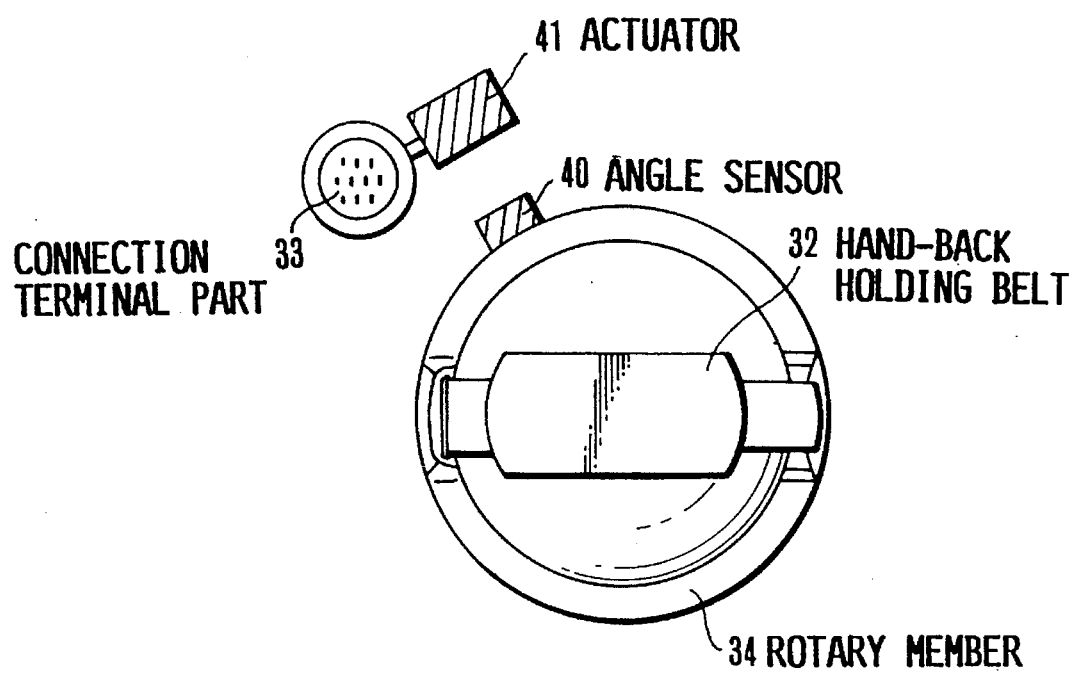
FIG. 16 shows another example of the arrangement of the turning movement control part of the video camera of FIG. 12.

In the case of FIG. 13, the connection terminal part 33 and the rotary member 34 are mechanically interconnected via a gear or gears. However, for obtaining the same advantageous effect of the invention, this arrangement may be changed as shown in FIG. 16 which shows a further embodiment of the invention. In that case, the rotary member 34 is provided with an angle sensor 40 for obtaining angle information. The angle information is transmitted to an actuator 41 to control thereby the turning movement of the connection terminal part 33.

Figure 17:
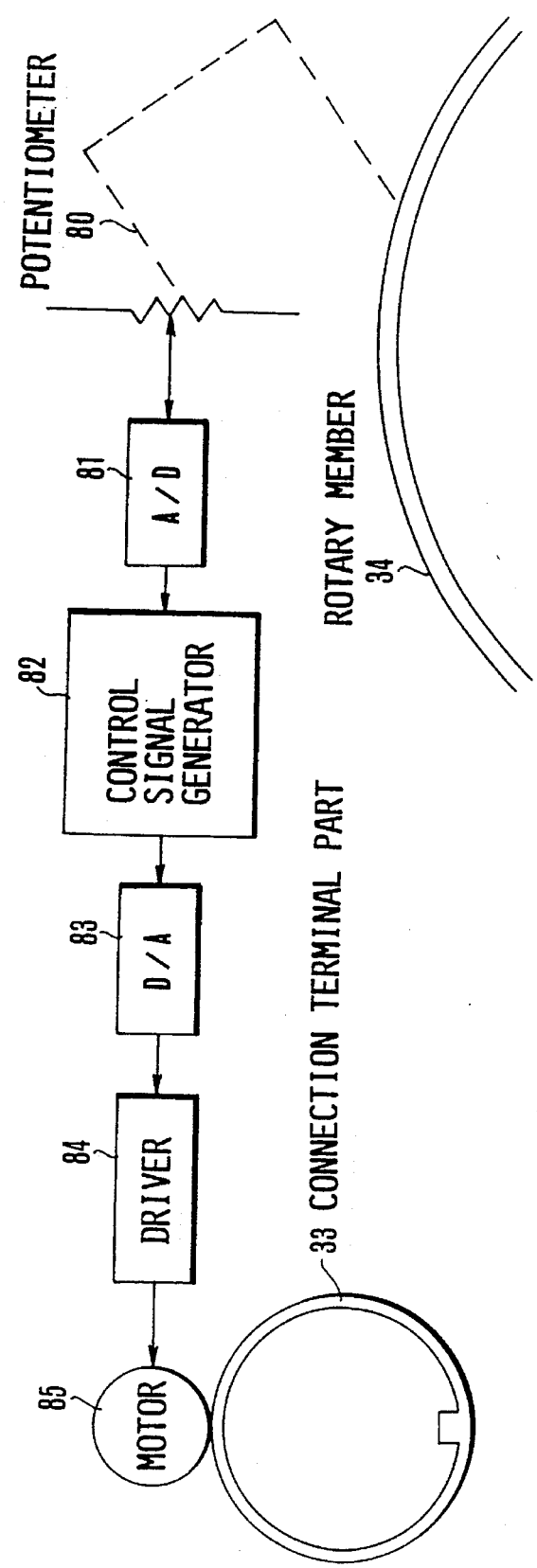
FIG. 17 shows by way of example the further details of the turning movement control part shown in FIG. 16.

FIG. 17 shows the circuit arrangement of the above-stated embodiment. The above-stated rotation angle sensor 40 is formed, in this case, with a potentiometer 80 which is arranged to vary its resistance value in association with the rotary member 34. The above-stated actuator 41 is composed of a motor 85 which is arranged to drive and turn the connection terminal part 33 which is provided for connection with the viewfinder.

A signal level corresponding to the resistance value of the potentiometer 80 is converted into a digital signal by an A/D (analog-to-digital) converter 81. The digital signal is applied to a control signal generator 82. The control signal generator 82 then generates a digital control signal for causing the connection terminal part 33 to turn at a rotation angle which is substantially equal to the rotation angle of the rotary member 34. This signal is converted into an analog signal by a D/A (digital-to-analog) converter 83. The analog signal is then amplified by a motor driver 84 to control the rotation of the motor 85 with this signal. This enables the viewfinder connection terminal part 33 to turn in association with a rotary grip. The viewfinder which is connected to the connection terminal part 33 thus can be turned to a desired rotation angle position. The connection terminal part is arranged such that the viewfinder is replaceable with another viewfinder of a different kind as long as the replacement functions similarly to the viewfinder. Besides, the viewfinder is replaceable by one touch with another one according to the shooting condition or the desire of the operator.

As described in the foregoing, in accordance with this invention, the viewfinder connection terminal part is arranged to be turnable in association with the rotary member of the grip part. Therefore, the optimum position of the viewfinder is obtainable with the viewfinder simply connected to the connection terminal part. A natural shooting posture can be retained at any desired shooting angle. The shooting operation can be safely carried out on the video camera. Besides, in accordance with the invention, the mechanism of the camera can be simplified.

What is claimed is:

1. A video camera comprising:

a) a camera body which contains therein converting means for converting an object image into an electrical video signal, said camera body being provided with an outwardly protruding part;

b) a rotary unit having a viewfinder capable of displaying an image related to said video signal, said rotary unit rotatably engaging said outwardly protruding part; and c) a grip member to be grasped by a hand to hold said camera body and constituting a portion of an outer surface of the camera, said grip member being fixed to said outwardly protruding part in the state that the whole of said rotary unit is engaged to said outwardly protruding part, said grip member holding said rotary unit on the outer surface thereof.

2. A video camera according to claim 1, wherein said rotary unit includes a mount part for mounting thereon a hand-back holding belt for supporting the hand to grasp said grip member.

3. A video camera according to claim 1, wherein said converting means includes an optical system arranged to receive an object image, and wherein said rotary unit includes a manual operation member which is provided for varying a zoom ratio of said optical system.

4. A video camera according to claim 1, wherein said camera body contains therein recording means for recording said video signal, and wherein said rotary unit includes a manual operation member which is provided for instructing said recording means to start or stop recording said video signal.

5. A video camera comprising:

(a) a camera body which contains therein converting means for converting an object image into an electrical video signal, said camera body being provided with an outwardly protruding part having a cylindrical face and a grip portion to be grasped by a hand to hold said camera body, wherein said grip portion is fixed to said outwardly protruding part; and (b) a rotary unit having a viewfinder capable of displaying an image related to said video signal, said rotary unit having a connection part which has an inner face of a shape corresponding to said cylindrical face and is carried in such a way that it is turnable relatively to said protruding part, wherein an electrical conductive material is formed in a circumferential direction of one of said cylindrical face and an inner circumferential face, while a contact is provided on the other of said cylindrical face and said inner circumferential face for electrical connection with said electrical conductive material.

6. A video camera comprising:

a) a camera body which contains therein converting means for converting an object image into an electrical video signal, said camera body being provided with an outwardly protruding part, said camera body having a grip portion to be grasped by a hand to hold said camera body, said grip portion constituting a portion of an outer surface of said camera body, said grip portion being fixedly mounted on said outwardly protruding part of said camera body so that said grip portion is stationary relative to said camera body; and b) a rotary unit having a viewfinder capable of displaying an image related to said video signal, said rotary unit rotatably engaging said outwardly protruding part, said rotary unit being held by said grip portion on the outer surface of said rotary unit so that said rotary unit is supported to be rotatable relative to said grip portion.

7. A video camera according to claim 6, wherein said converting means includes an optical system for receiving an incident light of the object image, and said rotary unit has a manual operation member for changing a zoom ratio of said optical system.

8. A video camera according to claim 6, wherein said rotary unit has a mount part for mounting thereon a hand-back holding belt for supporting the hand to grasp said grip portion.

9. A video camera according to claim 6, wherein said camera body contains therein recording means for recording said video signal, and said rotary unit has a manual operation member for instructing the recording means to stop or start recording of said video signal.

* * * * *